United States Patent [19]

Miller et al.

[11] Patent Number: 5,431,945
[45] Date of Patent: Jul. 11, 1995

[54] PROCESS FOR THE PREPARATION OF DRY BUTTER FLAKE PRODUCT HAVING HIGH MILK SOLID CONTENT

[76] Inventors: Van Miller, R.R. 2, Brisbane, Ontario N0B 1T0, Canada; Rene Miller, 9 Carey Crescent, Guelph, Ontario N1H 7J9, Canada

[21] Appl. No.: 216,321

[22] Filed: Mar. 23, 1994

Related U.S. Application Data

[62] Division of Ser. No. 56,747, May 4, 1993, Pat. No. 5,354,572.

[51] Int. Cl.$^6$ .......................... A23C 15/04; A23C 15/12
[52] U.S. Cl. ................................. 426/580; 426/581; 426/653; 426/663
[58] Field of Search .............. 426/581, 588, 663, 586, 426/653, 96, 664, 580

[56] References Cited

U.S. PATENT DOCUMENTS 1,509,088 9/1924 North .
3,582,353 6/1971 Fehr et al. ............................. 99/86
4,643,907 2/1987 Player et al. ........................ 426/580

OTHER PUBLICATIONS

"Reconstituted Butter-Like Spread", Norman et al, The Milk Product Journal, vol. 48, No. 12, Dec. 1954, p. 55.

*Primary Examiner*—Donald E. Czaja
*Assistant Examiner*—Curtis E. Sherrer
*Attorney, Agent, or Firm*—Donald E. Hewson

[57] ABSTRACT

This invention provides a dry butter flake product for incorporation into baked goods and flour confections, and methods of manufacture. The dry butter flake product comprises from substantially 0 to 2% moisture, from about 20% to about 60% dry dairy solids, and the balance is a butterfat. The dry dairy solids are naturally occurring milk solids from which substantially all water has been removed. The method of manufacture provides for mixture of the ingredients so that the solids are suspended in the butterfat. Butterfat or butter oil crystallization is initiated in a tempering unit, and the tempered product is deposited on a moving belt which passes through a cooling tunnel to cool and crystallize the fats to produce a dried butter flake product.

11 Claims, 4 Drawing Sheets

PROCESS FOR THE PREPARATION OF DRY BUTTER FLAKE PRODUCT HAVING HIGH MILK SOLID CONTENT

This application is a continuation of application Ser. No. 08/056,747 filed May 4, 1993, entitled Dry Butter-Based Flake Product Having High Milk Solid Content issued on Oct. 11, 1994, as U.S. Pat. No. 5,354,572.

FIELD OF THE INVENTION

This invention relates to dry flake products intended for incorporation into baked goods and other flour confections. The present invention specifically provides butter-based flakes or small discrete pieces or particles of prepared butter-based product which may be used for baking purposes so as to incorporate butter flavoured and butter-based chips of flakes into baked goods and other flour confections, where the flavour of the butter is retained in such a manner that it may be discerned when the baked product is consumed. The product, the process for making the product, and apparatus on which the product may be prepared, are described.

BACKGROUND OF THE INVENTION

It has been traditional for many years for the bakery industry, and the baked confection industry, to bring to the consuming product baked goods and flour confections where butter is a principal flavour ingredient, as well as being a bakery recipe component. Such products may include buns, biscuits, other breads and loaves, sweet confections, and so on. However, the preparation of baked products which would incorporate a butter-flavoured chip in the same manner as a chocolate chip—where the flavour permeates somewhat into the baked product and also has a distinct mouth sense when encountered while eating the product—has not heretofore been achieved. Specifically, incorporating chunks of butter into the mix just prior to baking has not been successful in achieving the criteria of flavour and mouth sense, and especially a physical and distinguishable presence.

In the preparation of baked goods and other flour confections by baking, butter is very often a constituent because it is included in the recipe. This may be especially true in the preparation of sweet baked products, flaky baked products such as croissants and other flake pastries, and so on. However, there may be a number of instances where it is desired to have a discernable butter presence, so as to have a mouth sense, such as in small breads, muffins, and certain cookies and the like. However, incorporating butter, such as by shaving or flaking frozen butter into the dough or pastry mix, is not successful because the butter smears or bleeds into the dough and therefore simply becomes a higher butter content in the baked product.

Butter is an essentially naturally occurring substance. It is prepared by separating and churning the butterfat (or butter oil) constituent of whole milk. Certain flavouring constituents, and especially salt, may be added to commercially available butter, but the main constituent is naturally occurring butterfat and butter oils. The flavour of butter is very discernable, and as such butter is very often used not only as a baking recipe constituent as one of the non-dry recipe ingredients by which the dough is formed, butter is also used for its own flavour. However, butter will tend to smear or bleed, whereby the oils in the butter tend to spread and combine with other ingredients, so that there can be no significant mouth sense of butter when it is included in baked products as a recipe ingredient. On the other hand, there is no practical means by which additional butter can be provided with baked goods or other flour confections in the same manner as butter is spread onto bread just prior to its being consumed, for example. However, the present invention provides means by which a specific mouth sense of butter may be derived in baked goods and other flour confections, by providing a physical presence and flavour of butter as a distinctive ingredient in the baked product, notwithstanding that the product has been baked. This is accomplished by mixing into the dough for the baked product, just prior to its being formed or placed into pans, etc., for baking, dry butter flake products which, when baked, will provide the flavour and mouth sense of butter. The dry butter flake products have a high milk solid content, as discussed below.

It has been noted that butterfat is derived from whole milk. Butterfat may, itself, be generally described as butter oils or butterfat, or clarified butterfat—which may, itself, be termed to be or analogous to anhydrous butter oils. Butterfat may have substantially 0% moisture content, up to about 1% moisture content.

As noted, the dry butter flake products according to the present invention have a high milk solid content. Milk solids may, themselves, be derived from conventional milk—whether it be whole milk, skim milk, or butter milk—using conventional milk drying operations that are well known in the dairy industry. Dry dairy solids may generally be classified as being whole milk solids, skim milk solids, butter milk solids, caseins, caseinates, whey, and lactose powders, all of which may have from substantially 0% up to about 2% moisture content. Thus, dry butter flake products according to the present invention will be provided in keeping with the present invention, where the dry butter flake product comprises from 0% to about 2% moisture, together with from about 20% up to about 60% of dry dairy solids, with the balance being butterfat which has less than 1% moisture content. As noted, the dry dairy solids are naturally occurring milk solids from which substantially all water has been removed; butterfat is derived from whole milk in the first instance; and since it is naturally occurring butterfat it will exhibit standard butterfat solid fat index and melting points, as discussed below.

There remains the question as to how a distinct butter presence, both physically and as to mouth sense, may be incorporated into baked goods and other flour confections.

The present inventors have quite unexpectedly discovered, that if naturally occurring milk solids, as discussed above, are suspended in butterfat or butter oils, and are then otherwise treated as described in greater detail hereafter, then a dry butter flake product results which can be baked into baked goods or other flour confections. The flavour sensations and constituency of the butter flake in the baked product are quite satisfactory.

It is recognized that the preparation of baked products or other flour confections having a distinctive physical butter presence and the concomitant mouth sense cannot simply be achieved by preparing flakes, chips or grated butter, such as from bulk frozen butter blocks and incorporating them into the bakery mix in much the same way as, for example, chocolate chips are incorporated into baked products. This is because, as noted above, butter will smear or oil off during baking.

One prior art approach is that of FEHR et al U.S. Pat. No. 3,582,353 issued Jun. 1, 1971. There, a flavoured and/or coloured shortening material of hard fat having a sharp melting point is used and distributed into the bakery mix. What results is distributed localized areas throughout the baked product, when it has been baked, that have a particular mouth sensation similar to butter. The flavouring materials may include spices, simulated meat, fruit, fowl or vegetable flavours, or other dairy flavours, as well as organic acids to provide sour flavours and the like. The intent has been particularly to provide a butter taste sensation using hard and brittle flakes. The resulting baked product is reported to have identifiable localized areas of the coloured and/or flavoured flake in spots throughout the baked product that have a discernable taste. It is recognized that there may be some discernable butter-like flavour, but it is also noted that the FEHR et al patent describes only localized areas of concentrated flavour, which is not necessarily a true or real flavour and which might be specifically of a more gummy texture and/or caramelized or salty flavour. Moreover, FEHR et al provide a product which is essentially fat, with very little solid constituent present in any event.

The present invention provides a dry butter flake product which does not exhibit the shortcomings of the prior art, and the common bakery experiences described above. Moreover, by providing a dry butter flake product, the present invention will provide what may be described as a butter product for incorporation into baked products and other flour confections, where the nature of the dry butter flake product may be such that its characteristics such as its viscosity and its ingredient contents may be determined and adjusted or tailored for specific intended uses. In other words, the present invention will provide a dry butter flake ingredient for incorporation into such varying products as tea biscuits or muffins which may have a relatively fast baking time—for example, 10 or 15 minutes—at baking temperatures of about 177° C. (350° F.) while also providing other butter flake ingredients to be baked into breads or croissants which may be baked for 30 or 40 minutes at temperatures above 177° C.

In order to do so, the process for preparation of the dry butter flake product of the present invention must be such that it can be controlled for consistency of results, and controlled for differences between dry butter flake products being manufactured at different times, as necessary.

In order for that to happen, certain criteria are required. Specifically, it is necessary that the formulation for preparation of the dry butter flake product must incorporate the use of butter oils that are compatible both with the dry milk solids being used, and with the bakery or other flour confection to be manufactured. Moreover, the butterfat or butter oils to be used in the formulation of dry butter flake products according to the present invention should not be such that they will smear or become part of the shortening or the butter ingredient being mixed into the bakery mix prior to the baking process; and they must be such that they will stay relatively firm during the baking process and yet have a mouth sense in that they will essentially melt in the mouth at approximately 35° C.

A corollary to the above is that, as is now being required more and more frequently and more rigidly, all of the ingredients used to prepare dry butter flake products in keeping with the present invention must be compatible with the requirements for controlled ingredient legends and other labelling provisions that are imposed on food products.

It is therefore a purpose of the present invention to provide dry butter flake products which are intended for incorporation into baked goods and flour confections. Such dry butter flake products as are provided by the present invention may have varying specific formulations, depending on their intended use in a baked product or other flour confection. However, the dry butter flake products of the present invention have a significant dry dairy solids content.

The present invention therefore provides dry butter flake products that may have defined ranges of solid fat and liquid fat components at defined temperatures, so as to be capable of being incorporated into baked goods and other flour confections and so that the baked goods or flour confections may be appropriately and accurately labelled.

In keeping with the above, the present invention provides processes for the preparation of dry butter flake products intended for incorporation into baked goods and flour confections.

Likewise, in keeping with the above, the present invention also provides process steps whereby the prepared dry butter flake products may have specific and controlled physical characteristics including the size of the individual discrete flakes being produced.

Finally, the present invention provides an apparatus for the preparation of the dry butter flake product where such product having defined characteristics and formulations may consistently be made with high degrees of automation.

BRIEF DESCRIPTION OF THE DRAWINGS

The present invention will be described in greater detail hereafter, in association with the accompanying drawings, in which.

DETAILED DESCRIPTION OF THE PREFERRED EMBODIMENTS

Figure 1:
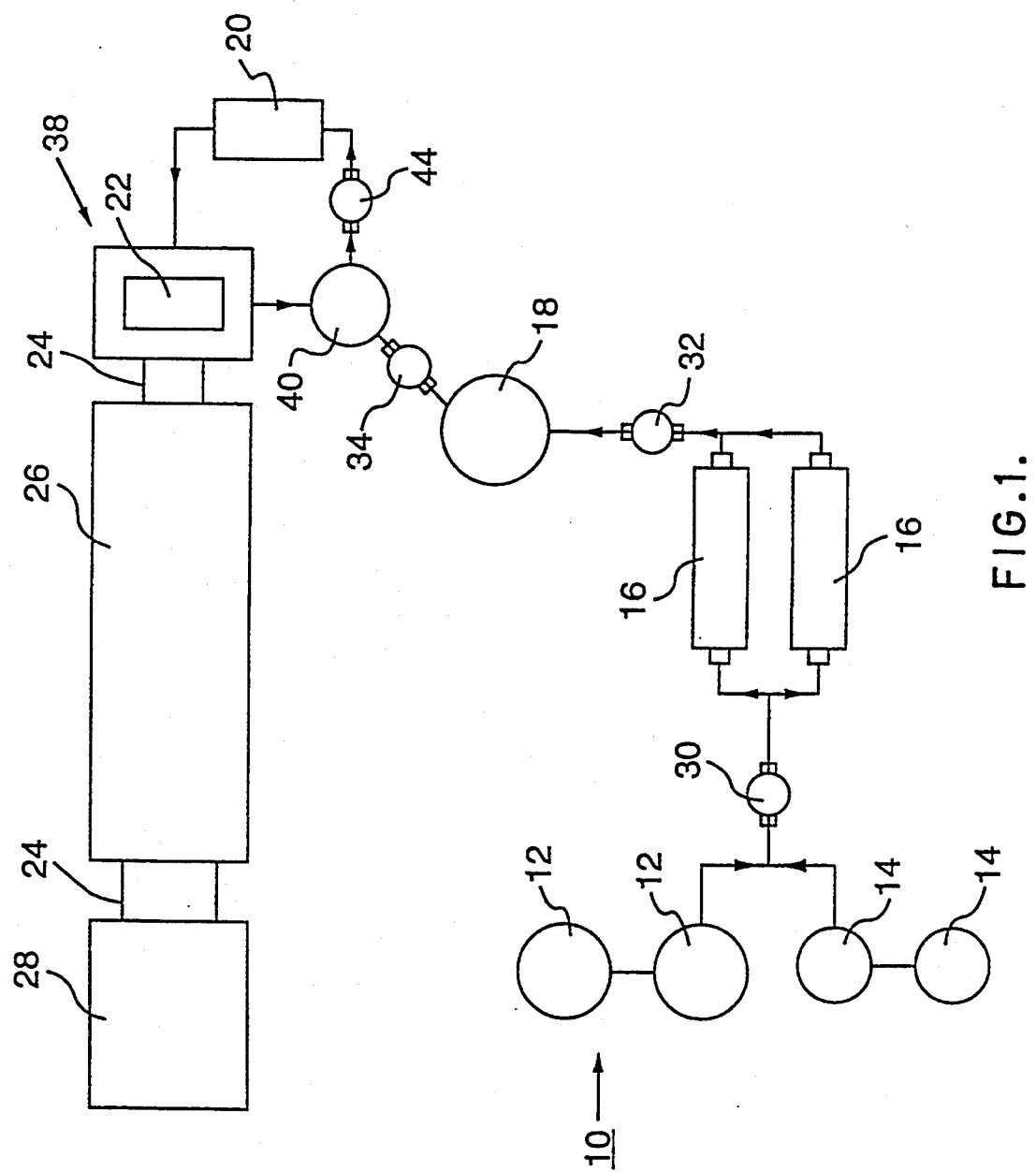
FIG. 1 is a schematic floor plan of a manufacturing facility in which dry butter flake products of the present invention may be made.

The following discussion will be carried out essentially in three portions. First, the dry butter flake product of the present invention will be described in terms of its physical characteristics, its constituency and formulations, and its purposes for incorporation into baked goods and flour confections. Then, the process for preparation of the dry butter flake products of the present invention will be described in greater detail than simply as by reference during the discussion of the product. Finally, the apparatus on which the dry butter flake products will be discussed in greater detail than simply as by reference during discussion of the process for manufacturing the products.

In general, the dry butter flake products of the present invention will have a formulation with from 0% to about 2% moisture, from about 20% to about 60% of dry dairy solids, with the balance being butterfat having less than 1% moisture content.

As to the dry dairy solids, they are naturally occurring milk solids from which substantially all water has been removed. Those dry dairy solids are derived from conventional milk using conventional milk drying operations, and may be such as whole milk solids, skim milk solids, butter milk solids, caseins, caseinates, whey, and lactose powders. The butterfat is derived from whole milk, and is generally defined as butterfat, butter oils, clarified butterfat, and anhydrous butter oils. The butterfat therefore exhibits standard solid fat index characteristics and melting points.

Of course, depending on the intended use, the balance constituent of the dry butter flake product according to the present invention may optionally further comprise additional ingredients. Those ingredients may be, for example, flavouring ingredients such as spices, herbs, salt, and other butter-compatible natural flavours. Still further, the balance constituent of the dry butter flake products may comprise small amounts of additional colouring ingredients such as annatto colours or other butter-compatible natural colouring agents.

As noted above, the butterfat will exhibit the standard characteristic curves which describe its solid fat index and melting points. Moreover, the butterfat and butter oils should exhibit the characteristic that they are sufficiently stable at about room temperature (20° C. ±) so that they will not smear during mixing with other prescribed ingredients of the baked goods and flour confections being made, prior to those baked goods and flour confections being baked.

Still further, the formulation of the dry butter flake product of the present invention should provide that the dry flakes have sufficiently slow flow rates so that they stay relatively firm during a baking process for the bakery product or flour confection being baked. Typically, the baking process may take place at temperatures from about 170° C. up to about 200° C., and the baking process may extend for periods of from about 5 minutes up to about 45 minutes.

When bakery products such as breads are being manufactured, the dough from which the bread is baked is usually proofed prior to baking. Thus, the dry butter flakes should also be such that they have sufficiently slow flow rates so that they stay relatively firm during a bakery proofing process which may take place at temperatures of from about 40° C. up to about 60° C., and for periods ranging from a few minutes up to about a few hours. On the other hand, the dry butter flakes will generally have a melting point of about 35° C. to about 40° C., so that they will melt in the mouth when the baked goods or flour confections are eaten.

Typically, dry butter flake products according to the present invention will have a physical thickness when they are first produced of from about 1.0 mm to about 3.0 mm. The flakes are generally rectangular or square when first produced, and will have a length along each of their sides of from about 1.0 cm to about 3.0 cm. The dry butter flake products will, when they are first introduced into the bakery mix, or even when they are delivered from being manufactured, exhibit the characteristic of being a dry flake which is relatively brittle. Although the dry flakes may fracture during handling, they may for the most part have the dimensions discussed above. However, when the dry flakes are, in fact, mixed into the bakery recipe, the individual pieces may break into smaller pieces but they still retain their physical integrity for when the bakery product is being eaten.

The following table sets out the ranges of solid fat and liquid fat components for butterfat and butter oils as they are to be used in the preparation of the dry butter flake products of the present invention. Specifically, the following table addresses the solid fat index curve ranges for butterfat.

Solid Fat Index Curve Characteristics for Butterfat 10.0° C.—35–55% solid fats, balance liquid fats
21.1° C.—18–40% solid fats, balance liquid fats
26.6° C.—10–20% solid fats, balance liquid fats
33.3° C.—2–12% solid fats, balance liquid fats
40.0° C.—0–5% solid fats, balance liquid fats.

It may be that, in order to achieve the solid fat index curve characteristics set forth in the table, above, it will be necessary to process the butterfat or butter oils being used by blending them, or fractionating, or hydrogenating, but only to the extent necessary so as to obtain the solid fat index curve having the defined ranges of solid fat and liquid components at the defined temperatures.

Turning now to the process by which the dry butter flake product as described above is manufactured, in its broadest sense the process comprises the following steps:

(a) Mixing the dry dairy solids and the butterfat so as to obtain a substantially homogenous mixture. The mixing is carried out at a temperatures of 35° C. to about 50° C., and ideally at temperatures of 40° C.±1.5° C.

(b) The homogenous mixture is then transferred to a holding tank. The temperature of the homogenous mixture is maintained at about 39° C. to about 45° C. while it is in the holding tank. Ideally, the holding tank temperature is maintained at about 40.5° C. to about 42° C.

(c) While the homogenous mixture is in the holding tank, it is continuously agitated.

(d) The homogenous mixture is pumped from the holding tank to a tempering unit, on demand as described hereafter. While the homogenous mixture is in the tempering unit it is also continuously agitated, but it is slightly cooled to a temperature of about 29° C. to 34° C., ideally about 33° C.±1° C.

(e) Then, the slightly cooled homogenous mixture is transferred and deposited in a substantially thin and substantially even layer on a moving belt.

(f) The moving belt is then passed through a cooling tunnel at such a speed that any single portion of the homogenous mixture deposited on the belt remains in the cooling tunnel until it has cooled to a temperature at which it breaks or snaps into discrete flakes—usually at a temperature of from about 6° C. to about 12° C. This usually means that any single portion of the homogenous mixture will remain in the cooling tunnel for from about three minutes to about six minutes.

(g) As the cooled homogenous mixture exits the cooling tunnel but while it is still on the moving belt, the cooled mixture is broken into discrete dry butter flakes.

(h) Finally, the discrete dry butter flakes are removed from the moving belt for further handling and/or storage and/or shipping.

Figure 2:
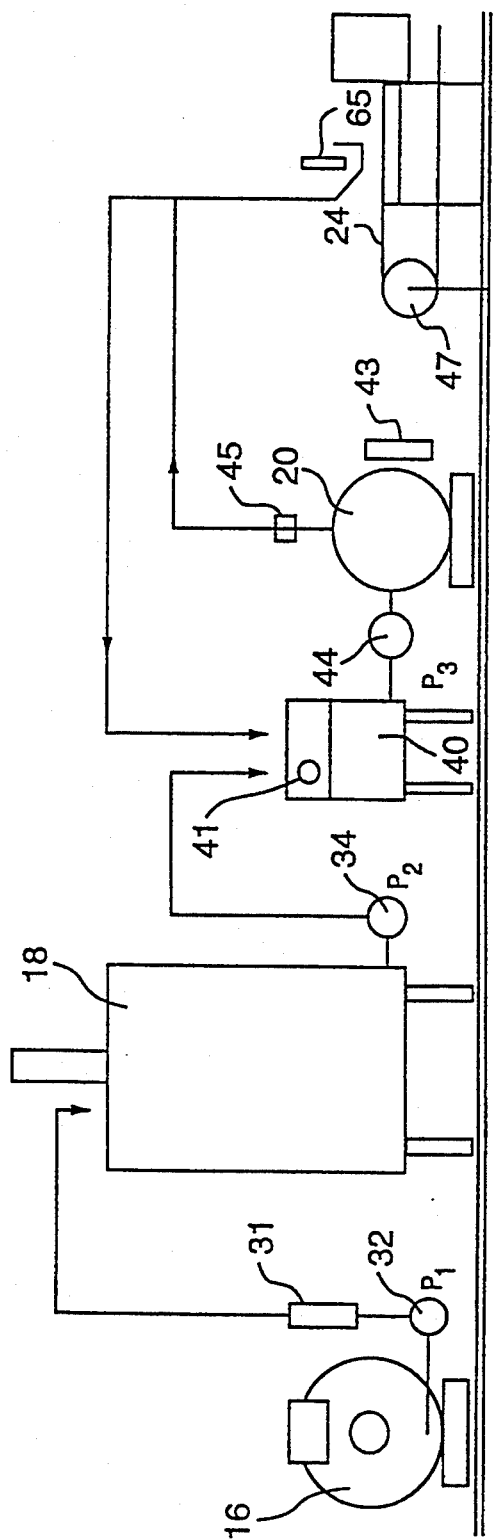
FIG. 2 is an idealized elevation view of the principal components of the manufacturing facility.

Referring to FIG. 1, the apparatus is shown generally at 10, and comprises the following generally elements or principal components, most of which are also noted in FIG. 2;

There may be a series of storage tanks such as tanks 12 and 14 in which the dried dairy solids, the butterfats and butter oils, flavouring ingredients and colouring ingredients may be stored. The precise nature of those storage tanks is not material to the present discussion, but it should be stated that in general those storage tanks and all associated piping and other components are made from suitable materials such as stainless steel in which food ingredients can be safely stored and handled under sanitary conditions. In general, the butterfats and butter oils, and perhaps even the other dry ingredients such as the dry dairy solids, and the colouring and flavouring additives, may be maintained in the storage tanks 12 and 14 at temperatures of about 42° C. to about 45° C. or even up to about 50° C., prior to being used.

In any event, appropriate amounts of the various ingredients are pumped or transferred using transfer pump 30 to at least one thermostatically controlled mixer 16. Each thermostatically controlled mixer 16 is a high torque closed mixer. Step (a) is carried out in the mixers 16 at 40° C.±1.5° C., or even at temperatures of about 35° C. up to about 50° C., until a substantially homogenous mixture of the ingredients is achieved. The viscosity and the ingredient content of the homogenous mixture that is achieved in the high torque mixer 16 will be dictated by the intended end use of the dry butter flake product being manufactured, as discussed above.

Then, using the first process pump 32, the resulting mixture is pumped through a filter 31 to at least one holding tank 18, as shown. As noted with respect to step (b), the homogenous mixture is maintained in the holding tank at a temperature of about 39° C. to 45° C., but usually at about 40.5° C. to about 42° C.; and in keeping with step (c), the homogenous mixture is continuously agitated while it remains in the holding tank 18. By continuously agitating the homogenous mixture in the holding tank 18, the dry dairy solids are maintained in suspension in the butterfat or butter oils, and thereby the homogeneity of the mixture is maintained.

Then, as required and on demand—as determined by an automatic level sensor 41—, the mixed and homogenous liquid having the dry dairy solids and other ingredients in suspension in the butterfat is pumped using the second process pump 34 to surge tank 40; and thence by continuous flow pump 44 to a tempering unit 20, in keeping with step (d). The tempering unit 20 is a heat exchanger, and while the homogenous mixture is in the tempering unit 20 it is also continuously agitated while being slightly cooled to a temperature of 29° C. to 34° C., usually about 33° C.±1° C. The tempering unit is generally a water-jacketed structure which is cooled by permitting flow of cooled water from a water cooler 43 as determined by a temperature probe 45 which senses the temperature of the cooled homogenous mixture as it exits the tempering unit 20.

By cooling the homogenous mixture, the crystallization process for the liquid homogenous mixture is initiated, with the crystallization being carried out ultimately within the cooling tunnel as described hereafter. Because the dry butter flake product is a crystallized product, it is important that the crystallization process be initiated under controlled conditions, and that will occur in the tempering unit. As the crystallization begins, and as the homogenous product beings to cool, it also becomes more viscous.

By the time the slightly cooled mixture, usually at about 33° C.±1° C. leaves the tempering unit 20, approximately 5% to about 8% of the butterfat constituent has crystallized.

The slightly cooled homogenous mixture is then transferred to a moving belt 24. It has been noted that pump 44 is a continuous flow pump, so that the homogenous mixture that is pumped to the tempering unit 20 is agitated within the tempering unit 20 by virtue of the internal labyrinthine design of the tempering unit, so that the homogenous mixture has a specific dwell time in the tempering unit and then passes from it having been slightly cooled and with crystallization of the butterfat constituent having been initiated. In keeping with step (e), the slightly cooled homogenous mixture is deposited on the moving belt in a substantially thin and substantially even layer. That is accomplished by pumping the mixture onto the surface of the belt 24 just behind an adjustable levelling means 22. The levelling means 22 is described in greater detail hereafter, but it is noted that the initial product is placed on the upper surface of the belt 24 at 62; and after passing beneath the levelling means 22 it forms a substantially thin and substantially even layer 64.

Then, as described in step (f) above, the moving belt 24 and the substantially thin and substantially even layer 64 is passed through a cooling tunnel 26. The speed of the moving belt may be adjusted so that any portion of the mixture in layer 64 remains in the cooling tunnel 26 unit it is cooled to a temperature of from about 5° C. to about 12° C. when it exits the cooling tunnel at the product handling station 28. At that temperature, the cooled product easily snaps or breaks. The dwell time to achieve such cooling is usually in the range of from about three minutes to about six minutes. The then cooled and dried layer 64 then passes through a breaking station 54 where the layer 64 is broken in discrete dry cooled butter flakes, in keeping with step (g).

Finally, the discrete dry cooled butter flakes are removed in keeping with step (h) from the belt 24 for further handling and/or storage and/or shipping. Typically, the flakes are removed from the belt 24 using a scraper 60 having delivery chute 66 associated with it.

However, it will be noted in FIGS. 1 and 2 that there is also associated with the delivery station 38 at the delivery end of the belt 24 other associated equipment. Specifically, there is provided the surge tank 40, with feed to it from pump 34, and more especially from the continuous flow process pump 44. What happens is that a level control sensor 65 senses the tendency for there to be excess mixture deposited at 62 on the belt 24. The excess that is not retained on the belt as it passes beneath the levelling means 22 is returned through a conduit 68 back to the surge tank 40. The surge tank 40 is maintained at about 38° C. to about 42° C. (usually 40.5° C. to 42° C.) so as to kill or re-liquify any crystallized fat that returns to it from the entry station 38. Then, after it has been re-heated in the surge tank 40, the continuous flow process pump 44 will return the re-heated mixture from the surge tank 40 back to the tempering unit 20 and thence to the entry station 38. Thus, there is a continuous flow loop from the surge tank 40 through the tempering unit 20, established by the pump 44. What excess mixture not deposited on the belt 24 is returned to the surge tank 40, as described above.

Figure 3:
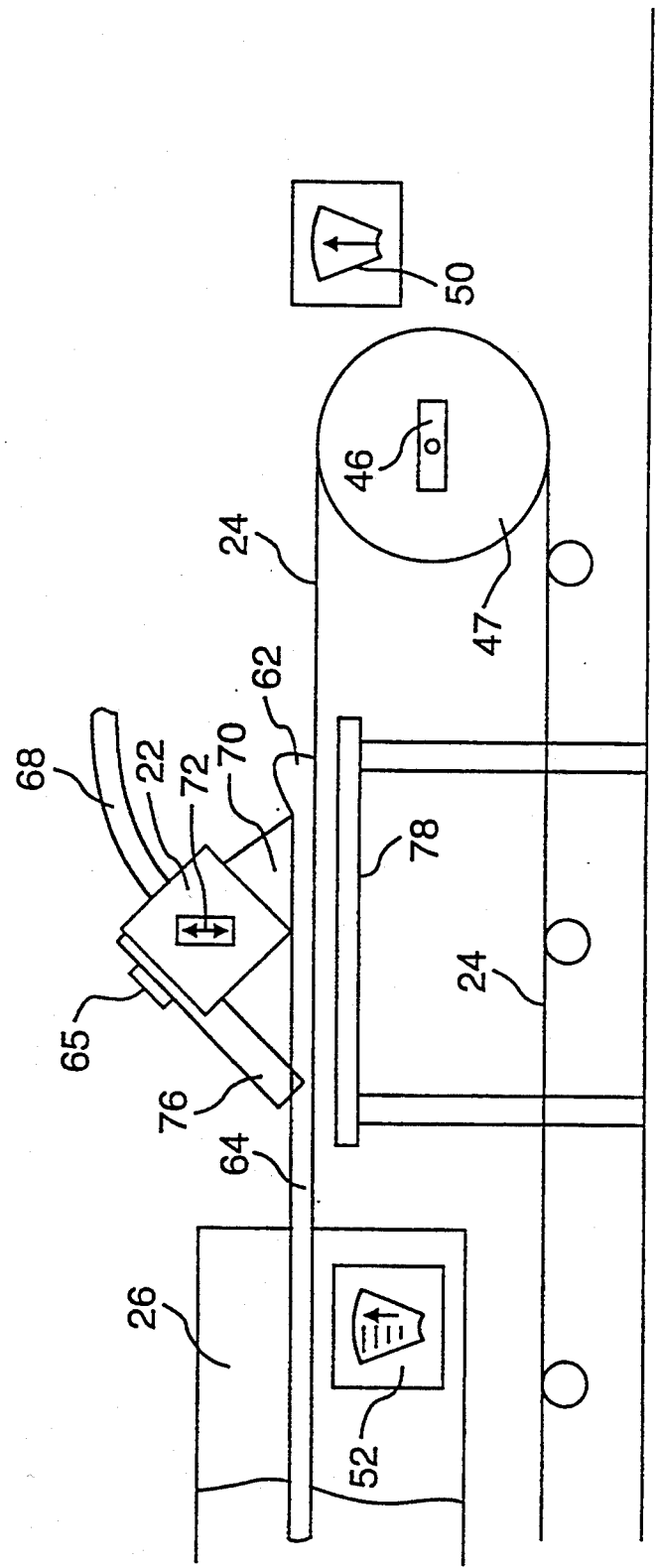
FIG. 3 is an idealized elevation view of the front end of a cooling tunnel and the associated equipment, in keeping with the present invention.

Thus, the quantity of the product that is deposited on the belt 24 at 62 is demand controlled, and means are provided including a bypass valve structure 70 and the conduit 68 to return excess homogenous mixed product to the surge tank 40. What remains passes beneath the adjustable levelling means 22, which includes a heated bar spreader. As noted in FIG. 3, the thickness of the layer 64 can be adjusted by adjusting means 72 on the levelling means 22, so as to move it up or down away from or closer to the surface of the belt 24. Thus, if there is too much mixed liquid product being delivered at 62 for the required depth or thickness of the layer 64 being deposited on the belt, then the bypass valve structure 70 will open and the excess mixed liquid product is returned to the surge tank 40.

From the above, it will be seen that any mixed liquid product that is not deposited on the belt for transfer through the cooling tunnel is continuously being circulated from the entry station 38 through the surge tank 40 to the tempering unit 20.

Obviously, the process step (a) of mixing the dry dairy solids and the butterfat may also comprise optionally mixing additional flavouring ingredients or additional colouring ingredients. As noted above, the additional flavouring ingredients may be chosen from the group consisting of spices, herbs, salt, or other butter-compatible natural flavours; and the additional colouring ingredients may be chosen from the group consisting of annatto colours and other butter-compatible natural colouring agents.

Figure 4:
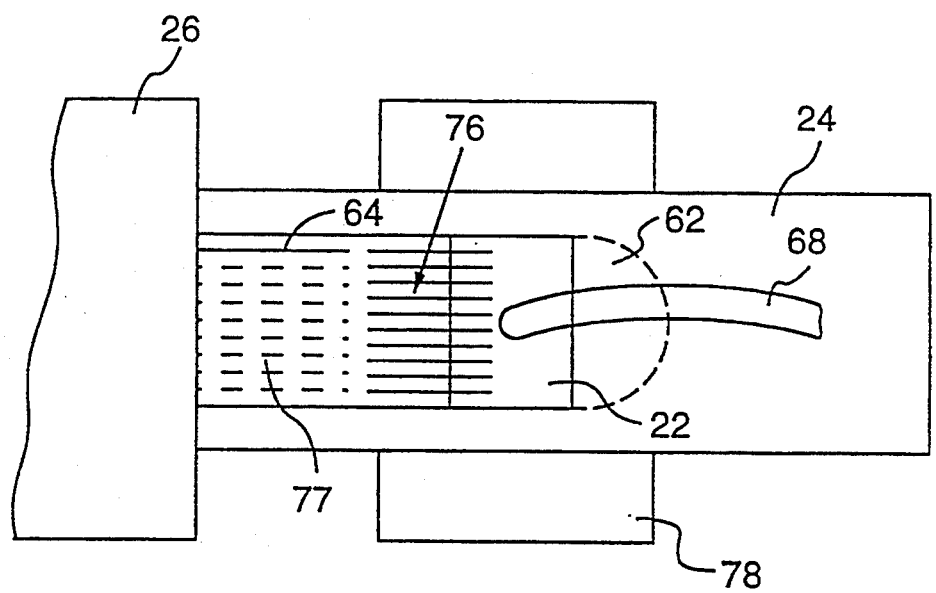
FIG. 4 is an idealized plan view of the apparatus of FIG. 3.

So as to ensure that the layer of product 64 when it is dried and cooled after passing through the cooling tunnel 26 will break into small discrete dry flakes, the deposited layer 64 is preferably scored by passing the deposited mixture in a direction parallel to the direction of motion of the belt 24 beneath scoring pins or blades 76. It will be seen from FIG. 4 that a plurality of score lines 77 can be formed in the layer 64, and thereby the dry butter flake product having discrete width portions will be formed. This is because the mixture of dry dairy solids, butterfat, and other additional ingredients is sufficiently viscous when it is scored to at least partially retain the scored impressions that are made in it.

Figure 5:
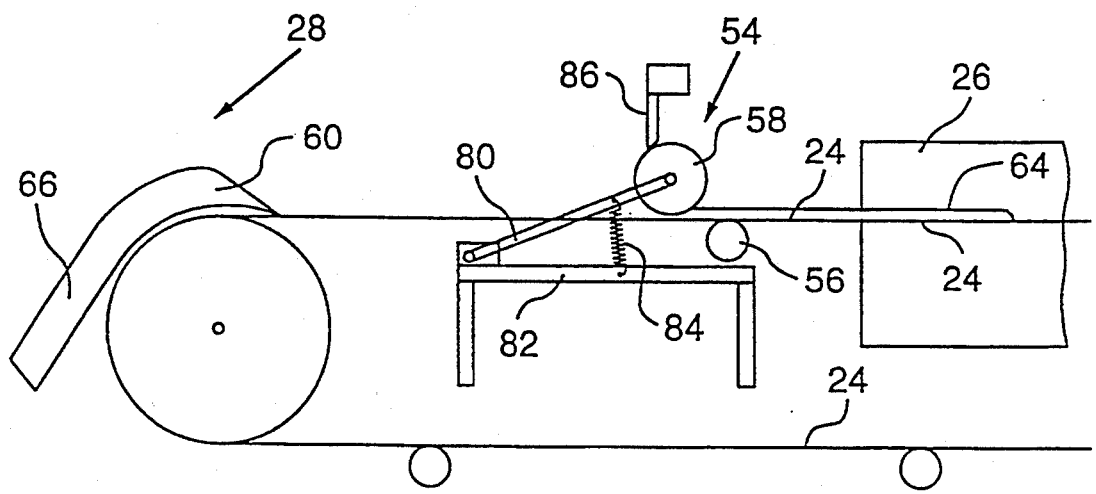
FIG. 5 is an idealized elevation of the exit end of a cooling tunnel of the apparatus of the present invention.

Process step (g) is carried out by passing the flexible belt 24 and the scored deposited mixture layer 64 on it into the breaker station 54. As noted in FIG. 5, at the breaker station 54 the belt and the mixture are passed over a fixed roller 56 and under a breaker roller 58. Because the belt is flexible, the weight of the breaker roller presses down onto the scored deposited layer 64, and the scored mixture fractures along fracture lines which are transverse to the direction of motion of the belt 24. Thus, there are formed discrete dry cooled butter flakes defined at their edges by the score lines 77, and transverse to the belt 24 by the fracture lines formed beneath the breaker roller 58.

The breaker roller 58 may be adjustable as to its distance away from the fixed roller 56, and as to the pressure that it exerts downwardly. The adjustment as to its lengthwise adjustment along the belt 24 may be arranged by adjusting the end of arm 80 relative to the mounting table 82; and the pressure exerted by the breaker roller 58 may be adjusted by adjusting a tension spring 84—which may also be an adjustable weight. So as to ensure that the breaker roller 58 is kept clean, a scraper 86 may be associated with it.

In general, so as to assure a controlled fracture of the layer 64 as it passes beneath the breaker roller 58, the diameter of the breaker roller 58 is larger than that of the fixed roller 56.

The scraper 60 and associated chute 66 are arranged to scrape the discrete dry cooled butter flakes that are then formed on the belt 24 as they pass beneath the breaker roller 58 off the surface of the belt, from which they may pass down the chute 66 into suitable waiting containers for additional handling and/or storage and/or shipping.

Tightening means 46 may be provided, for example on the roller 47 around which the belt 24 wraps at the entrance end of the cooling tunnel 26. The tightening means 46 provides enough adjustment that the belt 24 will be maintained substantially taut and level as it passes through the cooling runnel 26. Likewise, a speed adjustment 50 may be provided so as to control the speed of the flexible moving belt 24 so that any portion of the belt and the mixture deposited on the belt will remain in the cooling tunnel 26 for from about 3 minutes to about 6 minutes. Still further, temperature adjustment means 52 will be provided to control the temperature of the cooling tunnel 26 so that the mixture that is on the belt 24 will exit the cooling runnel at a temperature of from about 6° C. to about 12° C.

As noted above, the dimensions of the dry butter flakes as they are formed after passing beneath the breaker roller 58 will be such that their thickness is typically 1.0 mm to about 3.0 mm. The distance between the scoring blades 76 may be adjustable from typically about 1.0 cm up to about 3.0 cm. Likewise, the adjustment of the breaker roller 58 with respect to the fixed roller 56 will result in fracture lines transversely across the dried layer 64 at distances of from about 1.0 cm up to about 3.0 cm.

It has been found that, typically, commercial bakers will require that the dry butter flake product will have dimensions of approximately 1.5 mm thick and be about 1.5 cm square. However, it is recognized that the dry butter flake product flakes will possibly break up into smaller flakes during storage and shipping or handling, or even by further processing in the bakery. This is quite acceptable, because the butter flakes will otherwise retain their flavour and their physical integrity until the baked product is consumed. In that regard, it will be noted that the dry butter flake product flakes are typically relatively frangible when they are cool, but that are somewhat flexible when heated above room temperature, as will occur during the baking process.

There has been described dry butter flake products which may be incorporated into baked goods and other flour confections. Those products are derived from dry dairy solids together with butterfat and butter oils, and other optional ingredients. Processes for manufacturing the dry butter flake products have been described, and also the apparatus on which the products may be manufactured has been described. The product that is obtained provides a distinct physical and mouth sense butter flake presence when it is incorporated into a baked product.

The scope of the invention is defined by the appended claims.

What is claimed is:

1. A process for the preparation of dry butter-based flake product for incorporation into baked goods and flour confections, wherein said dry butter-based flake product comprises from substantially 0% to 2% moisture, from about 20% to about 60% dry dairy solids, with the balance being butterfat having less than 1% moisture content;

wherein said dry dairy solids are naturally occurring milk solids from which substantially all water has been removed;

wherein said butterfat is derived from whole milk; and wherein said butterfat exhibits standard butterfat solid fat index and melting points;

said process comprising the steps of:

(a) mixing said dry dairy solids and said butterfat so as to obtain a substantially homogenous mixture, said mixing step being carried out at a temperature of 35° C. to 50° C.;

(b) transferring said homogenous mixture to a holding tank, and maintaining the temperature of said homogenous mixture at about 39° C. to about 45° C.;

(c) continuously agitating said homogenous mixture while it is in said holding tank;

(d) pumping said homogenous mixture to a tempering unit, continually agitating said homogenous mixture while in said tempering unit, and slightly cooling said homogenous mixture to about 29° C. to 34° C.;

(e) transferring said slightly cooled homogenous mixture and depositing the same in a substantially thin substantially even layer on a moving belt;

(f) passing said moving belt through a cooling tunnel so that any portion of said mixture remains in said cooling tunnel until it has cooled to a temperature of from about 5° C. to about 12° C.;

(g) breaking said cooled mixture into discrete dry cooled butter-based flakes as it exits said cooling tunnel on said belt; and (h) removing said discrete dry cooled butter-based flakes from said belt for further handling and/or storage and/or shipping.

2. The process of claim 1, wherein said dry dairy solids are derived from conventional milk using conventional milk drying operations, and may be selected from the group consisting of whole milk solids, skim milk solids, butter milk solids, caseins, caseinates, whey, and lactose powders; and wherein said butterfat is selected from the group consisting of butter oils, clarified butterfat, and anhydrous butter oils.

3. The process of claim 1, wherein steps (d) and (e) are carried out continuously, and any excess mixture not deposited in step (e) is returned to a surge tank for said tempering unit and is heated to about 40° C.±2° C. to re-liquify any crystallized fat in said excess mixture, and then said re-heated mixture is returned to said tempering unit.

4. The process of claim 3, wherein step (a) may further optionally comprise adding additional flavoring ingredients to said mixture, where said flavoring ingredients are selected from the group consisting of spices, herbs, salt, and other butter-compatible natural flavors.

5. The process of claim 4, wherein step (a) may further optionally comprise adding additional coloring ingredients to said mixture, where said coloring ingredients are selected from the group consisting of annatto colors and other butter-compatible natural coloring agents.

6. The process of claim 1, wherein step (f) is carried out so that said any portion of said mixture remains in said cooling tunnel for from about three minutes to about six minutes.

7. The process of claim 5, further comprising the step of:

(i) after step (e), scoring said deposited mixture on said belt in a direction parallel to the direction of motion of said belt by passing said deposited mixture on said belt beneath one or a plurality of scoring pins or blades.

8. The process of claim 7, wherein step (g) is carried out by passing said belt and said scored, deposited mixture thereon over a fixed roller and under a breaker roller, wherein said breaker roller presses down onto said scored, deposited mixture and said belt is sufficiently flexible that said scored, deposit mixture fractures along fracture lines transverse to the direction of motion of said belt so as to form said discrete dry cooled butter-based flakes.

9. The process of claim 8, wherein step (h) is carried out at least in part by scraping said discrete dry cooled butter-based flakes off said moving belt.

10. The process of claim 8, wherein the thickness of said deposited mixture on said belt is from about 1.0 mm to about 3.0 mm, the distance between each of a plurality of scoring pins or blades is from about 1.0 cm to about 3.0 cm, and said breaker roller is positioned with respect to said fixed roller so that the distance between consecutive fracture lines is about 1.0 cm to about 3.0 cm.

11. The process of claim 6, wherein step (a) is carried out at a temperature of 40° C.±1.5° C.; wherein step (b) is carried out so that said homogenous mixture is maintained at about 40.5° C. to about 42° C.; and wherein step (d) is carried out so that said homogenous mixture is slightly cooled to about 33° C.±1° C.

* * * * *